United States Patent
Zhang et al.

(10) Patent No.: US 10,401,795 B2
(45) Date of Patent: Sep. 3, 2019

(54) DEVICE AND METHOD FOR RECORDING AND REPRODUCING HOLOGRAPHIC INFORMATION, DISPLAY APPARATUS

(71) Applicant: BOE TECHNOLOGY GROUP CO., LTD., Beijing (CN)

(72) Inventors: Yuxin Zhang, Beijing (CN); Hongfei Cheng, Beijing (CN); Yongda Ma, Beijing (CN); Xinyin Wu, Beijing (CN); Yong Qiao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 155 days.

(21) Appl. No.: 15/501,770

(22) PCT Filed: May 11, 2016

(86) PCT No.: PCT/CN2016/081673
§ 371 (c)(1),
(2) Date: Feb. 3, 2017

(87) PCT Pub. No.: WO2017/140044
PCT Pub. Date: Aug. 24, 2017

(65) Prior Publication Data
US 2018/0181064 A1  Jun. 28, 2018

(30) Foreign Application Priority Data

Feb. 19, 2016  (CN) .......................... 2016 1 0092581

(51) Int. Cl.
*G03H 1/22* (2006.01)
*G03H 1/04* (2006.01)
*G03H 1/02* (2006.01)

(52) U.S. Cl.
CPC ......... *G03H 1/2205* (2013.01); *G03H 1/0402* (2013.01); *G03H 1/0465* (2013.01);
(Continued)

(58) Field of Classification Search
CPC ............... G03H 1/2205; G03H 1/0465; G03H 2001/221; G03H 2222/53; G03H 2223/17; G11B 7/0065
USPC ............................................ 359/30
See application file for complete search history.

(56) References Cited

U.S. PATENT DOCUMENTS

| 2007/0153347 A1 | 7/2007 | Lan et al. |
| 2008/0212152 A1* | 9/2008 | Lerner ................. G03H 1/0011 359/21 |
| 2014/0043952 A1 | 2/2014 | Nagayoshi et al. |

FOREIGN PATENT DOCUMENTS

| CN | 1159046 A | 9/1997 |
| CN | 1774748 A | 5/2006 |

(Continued)

OTHER PUBLICATIONS

Office Action received for Chinese Patent Application No. 201610092581.5, dated Jan. 31, 2018, 19 pages (11 pages of English Translation and 8 pages of Office Action).

(Continued)

*Primary Examiner* — Wen Huang
(74) *Attorney, Agent, or Firm* — Womble Bond Dickinson (US) LLP

(57) ABSTRACT

A device and method for recording and reproducing holographic information, and a display apparatus are disclosed. The device for recording holographic information comprises an electro-optical regulating element, which is arranged in a light path between an object to be reproduced and a recording medium, receives an object beam scattered by the object to be reproduced, and regulates an outgoing direction and a focal distance of the object beam to irradiate the recording medium. The recording medium is configured to receive the reference beam from the light source and the object beam regulated by the electro-optical regulating element. The reference beam and the object beam form information relevant with the object to be reproduced in the recording medium. By regulating the outgoing direction and focal distance of beam with the electro-optical regulating element, it is unnecessary to rotate the recording medium for recording and reproducing the holographic information.

12 Claims, 3 Drawing Sheets

(52) U.S. Cl.
CPC .............. *G03H 2001/0216* (2013.01); *G03H 2001/0428* (2013.01); *G03H 2001/221* (2013.01); *G03H 2222/53* (2013.01); *G03H 2223/17* (2013.01); *G03H 2223/52* (2013.01); *G03H 2223/54* (2013.01)

(56) References Cited

FOREIGN PATENT DOCUMENTS

| | | | |
|---|---|---|---|
| CN | 1982949 | A | 6/2007 |
| CN | 101162591 | A | 4/2008 |
| CN | 101681144 | A | 3/2010 |
| CN | 101896974 | A | 11/2010 |
| CN | 103064275 | A | 4/2013 |
| CN | 103186091 | A | 7/2013 |
| CN | 103365196 | A | 10/2013 |
| CN | 104714392 | A | 6/2015 |
| CN | 105551508 | A | 5/2016 |
| CN | 205564287 | U | 9/2016 |
| JP | 2014-203500 | A | 10/2014 |

OTHER PUBLICATIONS

International Search Report and Written Opinion in PCT/CN2016/081673 dated Oct. 26, 2016, with English translation. 16 pages.
Office Action received for Chinese Patent Application No. 201610092581.5, dated Sep. 29, 2018, 21 pages (12 pages of English Translation and 9 pages of Office Action).

\* cited by examiner

DEVICE AND METHOD FOR RECORDING AND REPRODUCING HOLOGRAPHIC INFORMATION, DISPLAY APPARATUS

RELATED APPLICATIONS

The present application is the U.S. national phase entry of PCT/CN2016/081673, with an international filing date of May 11, 2016, which claims the benefit of Chinese Patent Application No. 201610092581.5, filed on Feb. 19, 2016, the entire disclosures of which are incorporated herein by reference.

TECHNICAL FIELD

The present disclosure relate to the field of display technique, and particularly to a device for recording holographic information, a device for reproducing holographic information, a method for recording holographic information, a method for reproducing holographic information, and a display apparatus.

BACKGROUND

Stereoscopic display based on holographic information has become more popular. During recording holographic information, two laser beams travelling in different directions, i.e., a reference beam and an object beam, interfere with each other to form an optical interference pattern. The optical interference pattern induces chemical or physical change in the photosensitive recording medium, so that information relevant with an object to be reproduced is recorded in the recording medium. During reproducing holographic information, a reference beam similar with the reference beam for recording is irradiated on the recording medium, so that the reference beam is diffracted by the optical interference pattern in the recording medium to reproduce the object beam, thus reproducing the information.

FIG. 1 is a schematic view illustrating a device for recording and reproducing holographic information. As shown in FIG. 1, a light source 10 like a laser device emits a source beam 11. The source beam 11 is split by a beam splitter 20 into a reference beam 21 and an object beam 22. The reference beam 21 is reflected by a reflecting mirror 30 as a reference beam 31, which irradiates on a photorefractive crystal 40. Besides, the object beam 22 irradiates an object to be reproduced 70 and then is diffusively reflected. The diffusively reflected object beam 72 irradiates the photorefractive crystal 40. The reference beam 31 and the object beam 72 overlap and interfere, so that information relevant with the object to be reproduced 70 is recorded by the photorefractive crystal 40.

SUMMARY

Embodiments of the present disclosure provide a device for recording holographic information, a device for reproducing holographic information, a method for recording holographic information, a method for reproducing holographic information, and a display apparatus.

In a first aspect, it is provided a device for recording holographic information, comprising a light source and a recording medium, the light source being configured to provide a reference beam and an object beam, wherein the device for recording holographic information further comprises an electro-optical regulating element, wherein the electro-optical regulating element is arranged in a light path between an object to be reproduced and the recording medium, receives the object beam which is scattered by the object to be reproduced, and regulates an outgoing direction and a focal distance of the object beam to irradiate the recording medium, and wherein the recording medium is configured to receive the reference beam from the light source and the object beam which has been regulated by the electro-optical regulating element, and the reference beam and the object beam form information relevant with the object to be reproduced in the recording medium. When the applied electrical signal (e.g. voltage) changes, the refractive index of the electro-optical regulating element changes. As a result, after passing through the electro-optical regulating element, an incident beam changes its direction and focal distance. According to the embodiment of the present disclosure, the electro-optical regulating element is adopted to regulate the outgoing direction and focal distance of the object beam for recording holographic information, so that it is unnecessary to rotate the recording medium to record holographic information. This simplifies recording process and improves recording reliability. Furthermore, since it is unnecessary to provide an actuating device for rotating the recording medium during recording, a number of elements in the device for recording holographic information is decreased, the construction is simplified and the cost is reduced. In addition, since the recording medium does not rotate, the crosstalk which otherwise would be caused by rotating the recording medium during recording is prevented.

For example, the device for recording holographic information further comprises a beam splitting element, which is configured to split a source beam from the light source into the reference beam and the object beam. The beam splitting element for example is a beam splitting prism, a polarization beam splitter, or the like. The beam splitting prism splits the source beam into a reflected beam and a transmitted beam which have a certain relative ratio in intensity and a certain intersection angle with each other. Exemplarily, the beam splitting prism splits the source beam into the reference beam and the object beam of equal intensity, the reference beam is the transmitted beam, and the object beam is the reflected beam. For example, the beam splitting element is any other optical element which is known for a person with ordinary skill in the art, provided that it is capable of splitting the source beam, and embodiments of the present disclosure do not intend to make any restriction in this regard.

For example, the device for recording holographic information further comprises at least one beam deflecting element, which is configured to deflect the reference beam to the recording medium and deflect the object beam to the object to be reproduced. For example, the beam deflecting element is a reflecting mirror, a total reflection prism, or the like. By arranging the beam deflecting element in the device for recording holographic information, the freedom for designing the light path is significantly increased. For example, the beam deflecting element is any other optical element which is known for the person with ordinary skill in the art, provided that it is capable of deflecting a beam, and embodiments of the present disclosure do not intend to make any restriction in this regard.

For example, the device for recording holographic information further comprises a beam expanding element, which is arranged in a light path between the light source and the beam splitting element, receives a source beam emitted by the light source, and expands and collimates the source beam for irradiating the beam splitting element. For example, the beam expanding element expands a diameter of the source beam, and decreases an angle of divergence of the source beam. For example, the beam expanding element is a Kepler type beam expander, a Galileo type beam expander, or other combinations of lenses. For example, the beam expanding element is any other optical element which is known for the person with ordinary skill in the art, provided that it is capable of expanding and collimating the source beam emitted by the light source, and embodiments of the present disclosure do not intend to make any restriction in this regard.

For example, the device for recording holographic information further comprises a beam concentrating element, which is arranged upstream the object to be reproduced, and converges the object beam to the object to be reproduced. For example the beam concentrating element is an optical element like a convex lens, which converges the object beam to increase its utilization efficiency. For example, the beam concentrating element is any other optical element which is known for the person with ordinary skill in the art, provided that it is capable of converging the object beam, and embodiments of the present disclosure do not intend to make any restriction in this regard.

For example, the electro-optical regulating element is a liquid crystal lens. An ordinary optical lens is thickness dependent and has a single refractive index and focal distance, so that it is not satisfactory for a small and mini optical system. In contrast, the liquid crystal lens is small in size and thickness, easy to integrate, capable of providing good image quality, fast in response, and adjustable in the focal distance. For example, under regulation of an electric field, the liquid crystal lens realizes the function of regulating the direction and focal distance of beam with a response time in the order of milliseconds. As compared with a conventional optical element, adopting the liquid crystal lens as the electro-optical regulating element for recording (and reproducing) holographic information is significantly advantageous. In the conventional optical element, generally various optical elements are needed for splitting, collimating, deflecting, and converging, or the like, so that the light path is complicated, the adjustment of light path is complicated and time consuming, and the system contains a large number of elements and is bulky. In case the electro-optical regulating element like the liquid crystal lens is used for recording (and reproducing) holographic information, the light path in the system is greatly simplified, so that the adjustment of light path is simple. Since the liquid crystal lens has a fast response speed, the beam is quickly regulated, thus the holographic information is recorded (and reproduced) quickly. The liquid crystal lens is small, compact, and easy to integrate, which facilitates miniaturization and integration of the holographic information recording (and reproducing) device. In addition, as compared with the conventional optical element like a lens, an array of lenses, or a combination of lenses, the liquid crystal lens is cheap, which facilitates wide applications of the liquid crystal lens and decrease in the cost of the holographic information recording (and reproducing) device.

For example, the recording medium is one of a photorefractive crystal, a photorefractive polymer, a photopolymer, and a photochromic material. For example, the recording medium is made from any holographic record material which is capable of changing the refractive index as a response to a beam at a certain wavelength.

For example, the light source is a laser device, and the reference beam is coherent with the object beam. By using the laser device as the light source for the device for recording holographic information, it is convenient to provide the reference beam and the object beam which are coherent with each other. The reference beam and the object beam interfere with each other to form an optical interference pattern, thus forming information relevant with the object to be reproduced in the recording medium.

In a second aspect, an embodiment of the present disclosure provides a device for reproducing holographic information, comprising a light source and a recording medium, the light source being configured to provide a reference beam, and the recording medium containing information relevant with the object to be reproduced which is formed by an object beam and the reference beam, wherein the device for recording holographic information further comprises an electro-optical regulating element, wherein the recording medium is configured to receive the reference beam from the light source, and the reference beam interacts with information in the recording medium to produce a reproducing beam, and wherein the electro-optical regulating element is arranged downstream the recording medium in a light path, receives the reproducing beam emitted from the recording medium, and regulates an outgoing direction and a focal distance of the reproducing beam to form an holographic image of the object to be reproduced. According to the embodiment of the present disclosure, the electro-optical regulating element is adopted to regulate the outgoing direction and focal distance of the reproducing beam for reproducing holographic information, so that it is unnecessary to rotate the recording medium to reproduce holographic information. This simplifies reproducing process and improves reproducing reliability. Furthermore, since it is unnecessary to provide an actuating device for rotating the recording medium during reproducing, a number of elements in the device for reproducing holographic information is decreased, the construction is simplified and the cost is reduced. In addition, since the recording medium does not rotate, the crosstalk which otherwise would be caused by rotating the recording medium during reproducing is prevented.

For example, the device for reproducing holographic information further comprises a beam expanding element, which is configured to receive source beam emitted by the light source, and to expand and collimate the source beam for irradiating the recording medium. The beam expanding element expands a diameter of the source beam, and decreases an angle of divergence of the source beam.

For example, the electro-optical regulating element is a liquid crystal lens. By adopting the liquid crystal lens as the electro-optical regulating element, miniaturization of the device for reproducing holographic information is facilitated.

In a third aspect, an embodiment of the present disclosure provides a display apparatus, comprising the device for recording holographic information as described above and the device for reproducing holographic information as described above.

The display apparatus according to an embodiment of the present disclosure has identical or similar beneficial effects with the device for recording holographic information and the device for reproducing holographic information as described above, which are not repeated here for simplicity.

In a fourth aspect, an embodiment of the present disclosure provides a method for recording holographic information, comprising steps of: receiving an object beam scattered by an object to be reproduced, and regulating an outgoing direction and a focal distance of the object beam to irradiate a recording medium, by means of an electro-optical regulating element; and irradiating the recording medium with a reference beam, so that the reference beam and the object beam form information relevant with the object to be reproduced in the recording medium.

For example, the method further comprises steps of: splitting the source beam emitted by a light source into the reference beam and the object beam; irradiating the object to be reproduced with the object beam; regulating the outgoing direction and the focal distance of the object beam scattered by the object to be reproduced; and irradiating the recording medium with the object beam, while irradiating the recording medium with the reference beam.

For example, the method further comprises a step of: prior to splitting the source beam emitted by the light source into the reference beam and the object beam, expanding and collimating the source beam.

For example, the step of irradiating the object to be reproduced with the object beam further comprises a step of: converging the object beam to the object to be reproduced.

In a fifth aspect, an embodiment of the present disclosure provides a method for reproducing holographic information, comprising steps of: irradiating a recording medium with a reference beam to produce a reproducing beam; and receiving the reproducing beam and regulating an outgoing direction and a focal distance of the reproducing beam to form a holographic image of an object to be reproduced, by means of an electro-optical regulating element.

For example, the method further comprises a step of: splitting the source beam emitted by a light source into a reference beam and an object beam, wherein the reference beam is identical with the reference beam for irradiating the recording medium to form information relevant with the object to be reproduced in the recording medium.

For example, the method further comprises a step of: prior to splitting the source beam emitted by the light source into the reference beam and the object beam, expanding and collimating the source beam.

For example, the electro-optical regulating element is a liquid crystal lens.

The method for recording and reproducing holographic information according to an embodiment of the present disclosure has identical or similar beneficial effects with the device for recording holographic information and the device for reproducing holographic information as described above, which are not repeated here for simplicity.

BRIEF DESCRIPTION OF THE DRAWINGS

The accompanying drawings are briefly described hereinafter to explain more clearly technical solutions of embodiments of the present disclosure. It is understood that these accompanying drawings only relate to some embodiments of the present disclosure, and do not intend to restrict the present disclosure in any manner.

DETAILED DESCRIPTION OF EMBODIMENTS

Figure 1:
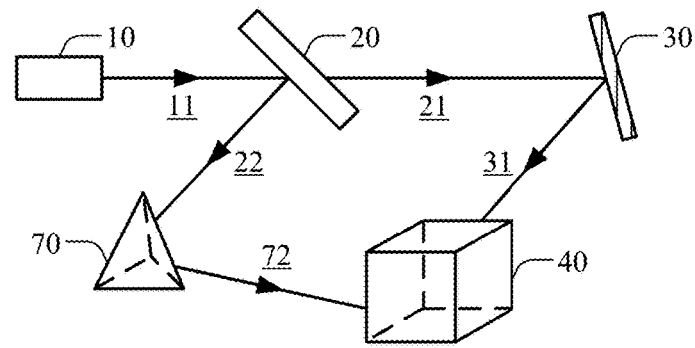
FIG. 1 is a schematic view for illustrating a device for recording and reproducing holographic information.

The specific embodiments of the present disclosure shall be further described in the following text with reference to the figures and the embodiments. The following embodiments are only used for explaining more clearly the technical solution of the present disclosure rather than limiting the protection scope of the present disclosure.

Reference numerals: 10 light source; 11 source beam; 20 beam splitter; 21 reference beam; 22 object beam; 30 reflecting mirror; 31 reference beam; 40 photorefractive crystal; 70 object to be reproduced; 72 object beam; 100 light source; 101 source beam; 110 beam expanding element; 120 beam splitting element; 121 reference beam; 122 object beam; 130 beam deflecting element; 140 recording medium; 142 reproducing beam; 150 beam deflecting element; 152 object beam; 160 beam concentrating element; 162 object beam; 170 object to be reproduced; 172 object beam; 180 electro-optical regulating element; 182, 182' object beam; 183 reproducing beam; 190 holographic image; 200 liquid crystal cell; 210 lower glass substrate; 220 lower electrode; 230 sealing agent; 240 upper electrode; 245 opening; 250 upper glass substrate; 260 liquid crystal molecules.

During recording process with the device for recording and reproducing holographic information shown in FIG. 1, the photorefractive crystal 40 is set at an angle, the device for recording and reproducing holographic information can only record a portion of the object beam 72 diffusively reflected by the object to be reproduced 70 which is received at a corresponding angle. In case it is required to completely record the object beam 72 diffusively reflected by the object to be reproduced 70, the photorefractive crystal 40 is required to be rotated to several angles, respectively. The object beam 72 diffusively reflected by the object to be reproduced 70 at these angles are recorded by the photorefractive crystal 40, so that the object to be reproduced 70 is recorded more truly. Namely, when the device for recording and reproducing holographic information records holographic information, the photorefractive crystal 40 are required to rotate to different angles for recording holographic information. Similarly, during reproducing holographic information, the photorefractive crystal 40 is also required to rotate for reproducing holographic information. Thus, in the device for recording and reproducing holographic information, an actuating device for rotating the photorefractive crystal is provided additionally, which increases design complexity.

To this end, embodiments of the present disclosure provide a device for recording holographic information, comprising a light source and a recording medium. The light source is configured to provide a reference beam and an object beam. The device for recording holographic information further comprises an electro-optical regulating element. The electro-optical regulating element is arranged in a light path between an object to be reproduced and the recording medium, receives the object beam which is scattered by the object to be reproduced, and regulates an outgoing direction and a focal distance of the object beam to irradiate the recording medium. The recording medium is configured to receive the reference beam from the light source and the object beam which has been regulated by the electro-optical regulating element, and the reference beam and the object beam form information relevant with the object to be reproduced in the recording medium.

Figure 2:
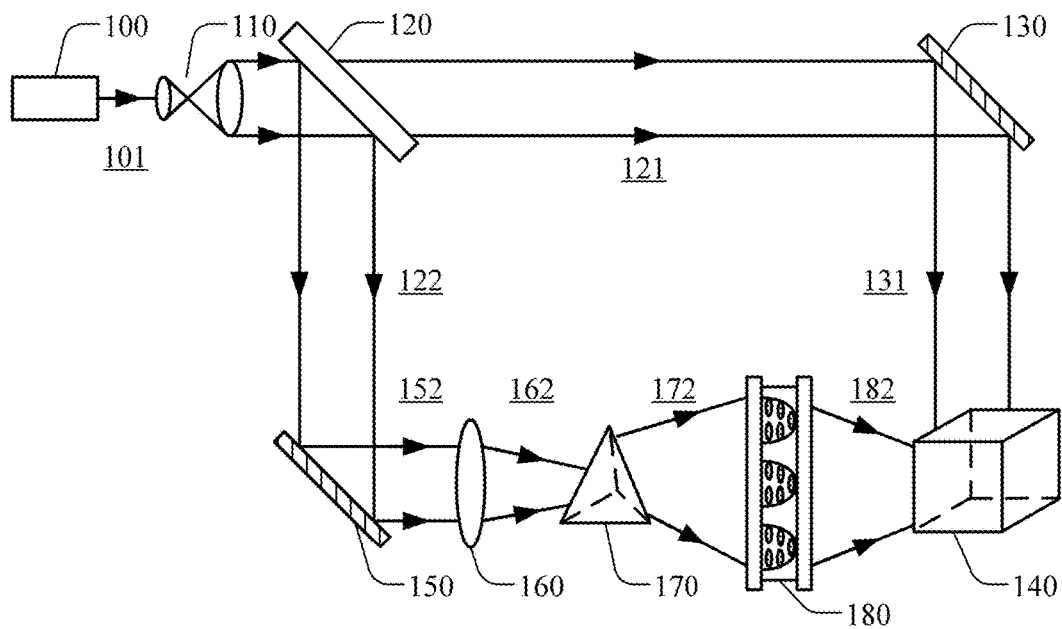
FIG. 2 is a schematic view for illustrating a device for recording holographic information in an embodiment of the present disclosure.

The device for recording holographic information will be described hereinafter with reference to FIG. 2 and the implementations herein. FIG. 2 is a schematic view for illustrating a device for recording holographic information in an embodiment of the present disclosure. As shown in FIG. 2, the device for recording holographic information comprises a light source 100 and a recording medium 140, the light source 100 is configured to provide a reference beam 121 and an object beam 122. The device for recording holographic information further comprises an electro-optical regulating element 180, which is arranged in a light path between an object to be reproduced 170 and the recording medium 140. The electro-optical regulating element 180 receives an object beam 172 scattered by the object to be reproduced 170, and regulates an outgoing direction and focal distance of an object beam 182 to irradiate the recording medium 140. The recording medium 140 is configured to receive a reference beam 131 from the light source 100 and the object beam 182 which is regulated by the electro-optical regulating element 18. The reference beam 131 and the object beam 182 form information relevant with the object to be reproduced 170 in the recording medium 140.

According to the embodiment of the present disclosure, the electro-optical regulating element is adopted to regulate the outgoing direction and focal distance of the object beam for recording holographic information, so that it is unnecessary to rotate the recording medium to record holographic information. This simplifies recording process and improves recording reliability. Furthermore, since it is unnecessary to provide an actuating device for rotating the recording medium during recording, a number of elements in the device for recording holographic information is decreased, the construction is simplified and the cost is reduced. In addition, since the recording medium does not rotate, the crosstalk which otherwise would be caused by rotating the recording medium during recording is prevented.

The device for recording holographic information further comprises a beam splitting element 120. The beam splitting element 120 is configured to split a source beam 101 emitted by the light source 100 into the reference beam 121 and the object beam 122. For example, the beam splitting element 120 is a beam splitting prism, a polarization beam splitter, or the like. Exemplarily, the beam splitting element 120 is a beam splitting prism, which splits the source beam 101 into the reference beam 121 and the object beam 122 of equal intensity. As shown, the reference beam 121 is the transmitted beam, and the object beam 122 is the reflected beam.

For example, the device for recording holographic information further comprises at least one beam deflecting element 130, 150. The beam deflecting element 130 is configured to deflect the reference beam 121 to the recording medium 140. The beam deflecting element 150 is configured to deflect the object beam 122 to the object to be reproduced 170. For example, the beam deflecting element 130, 150 is a reflecting mirror, a total reflection prism, or the like.

For example, the device for recording holographic information further comprises a beam expanding element 110. The beam expanding element 110 is arranged in a light path between the light source 100 and the beam splitting element 120, receives the source beam 101 emitted by the light source 100, and expands and collimates the source beam 101 for irradiating the beam splitting element 120. The beam expanding element 110 expands a diameter of the source beam 101, and decreases an angle of divergence of the source beam 101. For example, the beam expanding element 110 is a Kepler type beam expander, a Galileo type beam expander, or other combinations of lenses.

For example, the device for recording holographic information further comprises a beam concentrating element 160. The beam concentrating element 160 is arranged upstream the object to be reproduced 170, and converges the object beam 152 deflected by the beam deflecting element 150 to the object to be reproduced 170. The beam concentrating element 160 is an optical element like a convex lens, for forming a converged object beam 162 to increase utilization efficiency.

For example, the electro-optical regulating element 180 is a liquid crystal lens. The liquid crystal lens is a typical micro-optical element, has advantages like small in size and thickness, easy to integrate, capable of providing good image quality, fast in response, and adjustable in the focal distance. For example, under regulation of an electric field, the liquid crystal lens realizes the function of regulating the direction and focal distance of beam with a response time in the order of milliseconds. Thus, by adopting the liquid crystal lens as the electro-optical regulating element 180, miniaturization of the device for recording holographic information is facilitated. For example, the liquid crystal lens is a Polymer Dispersed Liquid Crystal (PDLC) lens, or other type of liquid crystal lens.

Figure 3A:
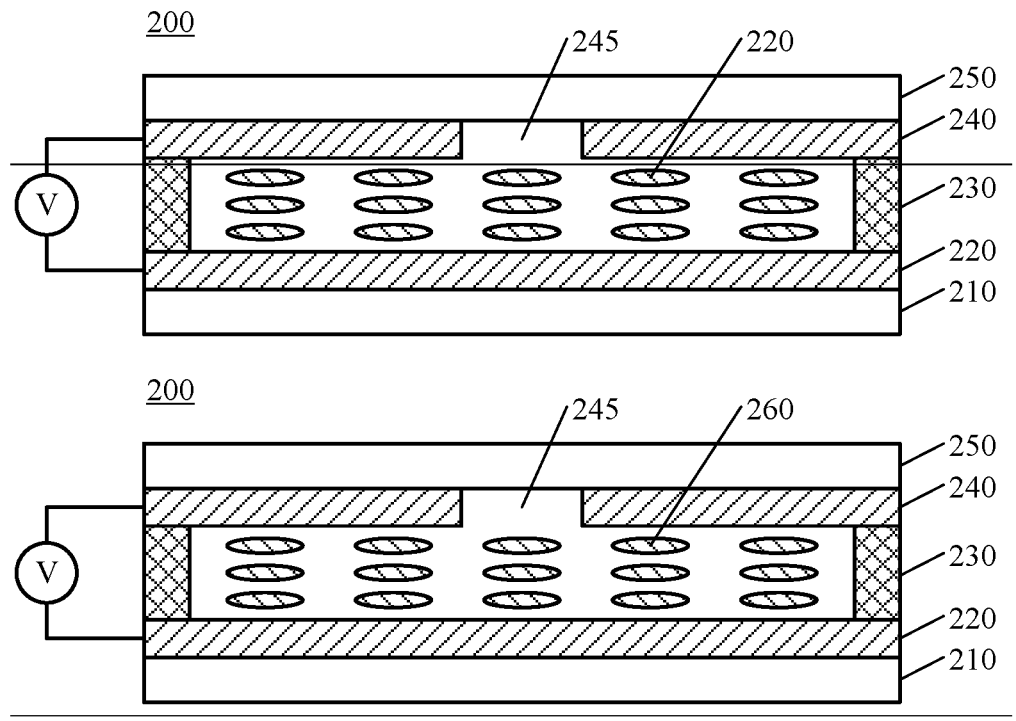
FIG. 3A and FIG. 3B are structural views illustrating a liquid crystal lens in an embodiment of the present disclosure.
Figure 3B:
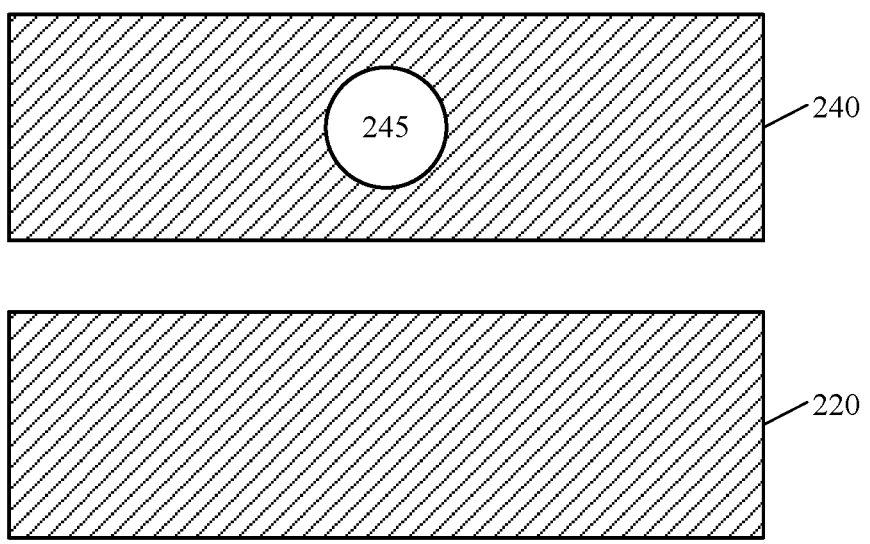

In an exemplary embodiment, as shown in FIG. 3A and FIG. 3B, the liquid crystal lens is realized by a liquid crystal cell 200 with an asymmetric electrode structure. FIG. 3A is a cross-sectional view for the liquid crystal cell 200. As shown in FIG. 3A, the liquid crystal cell 200 comprises a lower glass substrate 210 and an upper glass substrate 250, which are assembled with a sealing agent 230. A lower electrode 220 is arranged a side of the lower glass substrate 210 facing the upper glass substrate 250, and an upper electrode 240 is arranged on a side of the upper glass substrate 250 facing the lower glass substrate 210. The lower electrode 220 and the upper electrode 240 are made from a transparent electrically conductive material like indium tin oxide (ITO). The liquid crystal cell 200 further comprises liquid crystal molecules 260 which are sandwiched between the upper and lower glass substrate. As shown in FIG. 3B, the lower electrode 220 is a palte shaped electrode, and the upper electrode 240 is provided with a circular opening 245 which is formed by etching. As a result, the lower electrode 220 and the upper electrode 240 form an asymmetric structure, and form a liquid crystal lens. When a voltage is applied between the lower electrode 220 and the upper electrode 240, a non-uniform electric field is generated in the liquid crystal cell 200, which induces the director of liquid crystal molecules 260 to form a non-uniform distribution of effective refractive index. Namely, the liquid crystal molecules 260 exhibit a gradient distribution of refractive index like an optical lens, which deflects the beam to regulate its direction and focal distance. It is noted that the opening 245 in the upper electrode 240 can have a shape other than the circular shape. In an exemplary embodiment, the opening 245 has a ring shape. In other exemplary embodiments, the upper electrode 240 is a plate electrode, and the lower electrode 220 is provided with an opening. It is required to form the opening in only one of the upper electrode and lower electrode, and an asymmetric electrode structure is formed to realize the function of a lens. This liquid crystal lens is simple in structure and compatible with the current process for a LCD panel.

Alternatively, the liquid crystal lens is realized by a liquid crystal cell with a spherical chamber. For example, a convex spherical structure is formed in an electrically conductive liquid crystal cell with symmetric plates. Liquid crystal is injected into the spherical structure to realize focusing. The optical axes of liquid crystal rotate under control of an electric field, leading to change in the refractive index, and thus regulating the focal distance. By forming the spherical chamber in the liquid crystal cell and injecting liquid crystal into the spherical chamber, the thickness of a material is changed effectively. This realizes a distribution of the refractive index of beam, thus ensuring stability of the electro-optical regulating element during recording (and reproducing) holographic information.

For example, the recording medium 140 is one of a photorefractive crystal, a photorefractive polymer, a photopolymer, and a photochromic material. In an embodiment of the present disclosure, the recording medium 140 is described by taking a photorefractive crystal as an example. The photorefractive crystal generally comprises electro-optic crystals and bismuth silicon oxides. The electro-optic crystals have large electro-optic coefficients and high diffraction efficiency. The bismuth silicon oxides have a short response time and large photorefractive sensitivity. Common photorefractive crystals comprise lithium niobate ($LiNbO_3$), lithium tantalite ($LiTaO_3$), barium titanate ($BaTiO_3$), potassium niobate ($KNbO_3$), bismuth silicate ($Bi_{12}SiO_{20}$), bismuth germinate ($Bi_{12}GeO_{20}$), or the like. A photopolymer has advantages like high photo sensitivity, a large dynamic range, and a high recording density, and can also be applied to the recording medium 140 in embodiments of the present disclosure. Exemplarily, the recording medium 140 is a photorefractive polymer like PMMA: DTNB:C60, PQ/PMMA.

For example, the light source 100 is a laser device, thereby provide the coherent reference beam 121 and object beam 122 in a convenient manner. For example, the light source 100 is another optical device which is capable of generating and emitting laser.

Figure 4A:
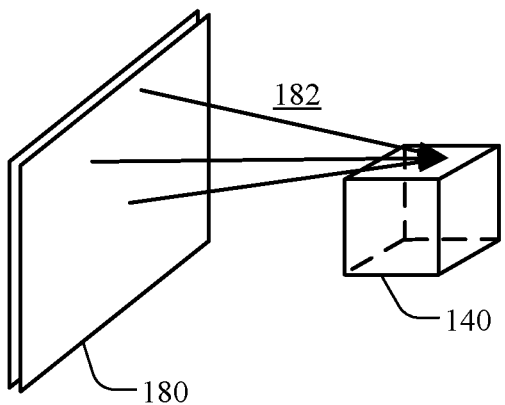
FIG. 4A and FIG. 4B are views for illustrating the principle for an electro-optical regulating element for recording holographic information in an embodiment of the present disclosure.
Figure 4B:
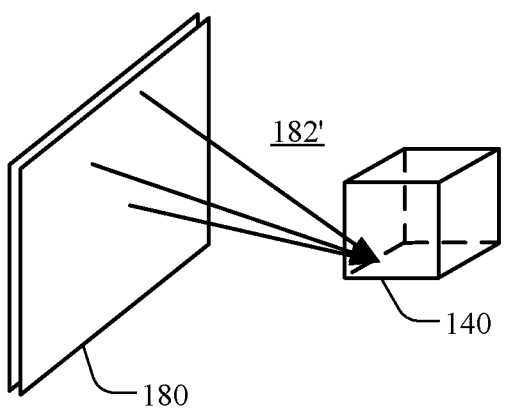

FIGS. 4A and 4B are views for illustrating the principle for the electro-optical regulating element for recording holographic information in an embodiment of the present disclosure. As shown in the figures, upon applying an electrical signal, the electro-optical regulating element 180 focuses the object beam 182 onto a point on the recording medium 140. When the electrical signal changes, the electro-optical regulating element 180 deflects and focuses the object beam 182 onto another point on the recording medium 140. Exemplarily, the electrical signal is a voltage signal. It is seen that recording of holographic information is realized by adopting the electro-optical regulating element to regulate the outgoing direction and focal distance of the object beam, so that during recording holographic information, it is unnecessary to rotate the recording medium.

An embodiment of the present disclosure provides a device for reproducing holographic information, comprising a light source and a recording medium. The light source is configured to provide reference beam. The recording medium contains information relevant with the object to be reproduced which is formed by an object beam and the reference beam. The device for recording holographic information further comprises an electro-optical regulating element. The recording medium is configured to receive the reference beam from the light source, and the reference beam interacts with information in the recording medium to produce a reproducing beam. The electro-optical regulating element is arranged downstream the recording medium in a light path, receives the reproducing beam emitted from the recording medium, and regulates an outgoing direction and a focal distance of the reproducing beam to form an holographic image of the object to be reproduced.

Figure 5:
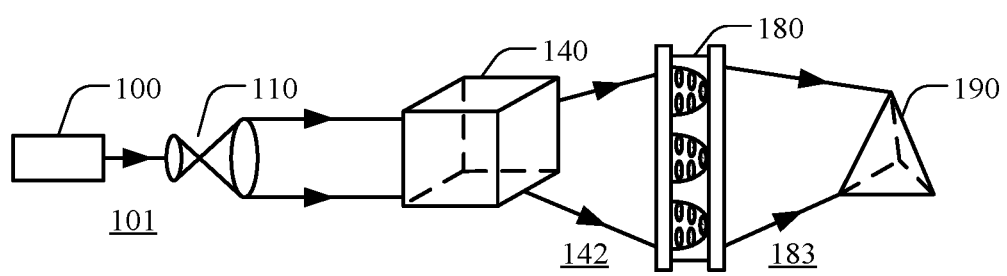
FIG. 5 is a schematic view for illustrating a device for reproducing holographic information in an embodiment of the present disclosure.

The device for reproducing holographic information will be described hereinafter with reference to FIG. 5 and the implementations herein. FIG. 5 is a schematic view for illustrating the device for reproducing holographic information in an embodiment of the present disclosure. As shown in FIG. 5, the device for reproducing holographic information comprises the light source 100 and the recording medium 140. The light source 100 is configured to provide the reference beam. The recording medium 140 contains information relevant with the object to be reproduced which is formed by the object beam and the reference beam. The device for recording holographic information further comprises the electro-optical regulating element 180. The recording medium 140 is configured to receive the reference beam from the light source 100. The reference beam interacts with information in the recording medium 140 to produce a reproducing beam 142. The electro-optical regulating element 180 is arranged downstream the recording medium 140 in a light path, receives the reproducing beam 142 emitted by the recording medium 140, and regulates an outgoing direction and a focal distance of a reproducing beam 183 to form a holographic image 190 of the object to be reproduced 170.

According to the embodiment of the present disclosure, the electro-optical regulating element is adopted to regulate the outgoing direction and focal distance of the reproducing beam for reproducing holographic information, so that it is unnecessary to rotate the recording medium to reproduce holographic information. This simplifies reproducing process and improves reproducing reliability. Furthermore, since it is unnecessary to provide an actuating device for rotating the recording medium during reproducing, a number of elements in the device for reproducing holographic information is decreased, the construction is simplified and the cost is reduced. In addition, since the recording medium does not rotate, the crosstalk which otherwise would be caused by rotating the recording medium during reproducing is prevented.

It is noted that the device for reproducing holographic information described with reference to FIG. 5 is constructed on basis of the device for recording holographic information described with reference to FIG. 2. However, in another embodiment, the device for reproducing holographic information is formed separately. In view of factors like the construction cost, the stability of light path, or the like, the device for reproducing holographic information generally is constructed on basis of the above described device for recording holographic information. In a case, the light path upstream the recording medium 140 in FIG. 5 adopts the light path upstream the beam deflecting element 130 in FIG. 2, and thus the reference beam 121 is used for providing the reference beam for reproducing holographic information. In another case, the light path upstream the recording medium 140 in FIG. 5 adopts the light path which is located upstream the recording medium 140 and comprises the beam deflecting element 130 in FIG. 2, and thus the reference beam 131 is used to provide the reference beam for reproducing holographic information. In both cases, for example, by shielding the object beam 122 in FIG. 2 with a light shielding plate, and appropriately modifying the positions of the electro-optical regulating element 180 and the recording medium 140 in the light path, the device for reproducing holographic information shown in FIG. 5 is obtained. Thus, description for elements in the device for recording holographic information shown in FIG. 2 also applies to elements in the device for reproducing holographic information shown in FIG. 5. Exemplarily, the device for reproducing holographic information further comprises the beam expanding element 110. Similarly, in an exemplary embodiment, the electro-optical regulating element 180 is a liquid crystal lens.

It is noted that the devices shown in FIG. 2 and FIG. 5 further comprise electronic elements, e.g., a driver circuit for driving the electro-optical regulating element 180. The devices shown in FIG. 2 and FIG. 5 further comprise other optical elements. For example, in FIG. 2, a beam concentrating element is present between the object to be reproduced 170 and the electro-optical regulating element 180, for converging the object beam 172 to the electro-optical regulating element 180. Similarly, in FIG. 5, a beam concentrating element is present between the recording medium 140 and the electro-optical regulating element 180, for converging the reproducing beam 142 to the electro-optical regulating element 180. Furthermore, in FIG. 2 and FIG. 5, a shutter for example is arranged downstream the light source 100 to modify the intensity of the source beam 101. In FIG. 5, the source beam 101 is regulated for example by a shutter to provide the reference beam for reproducing. Besides, in an exemplary embodiment, by means of the beam splitting element 120 shown in FIG. 2, the source beam 101 is split into the reference beam for reproducing.

It is noted that the expression "the beam concentrating element arranged upstream the object to be reproduced" as used in this context indicates that, in the light path the device for recording holographic information, the beam concentrating element is arranged upstream the object to be reproduced. Namely, the object beam passes the beam concentrating element, and then impinges onto the object to be reproduced. In the device for recording holographic information, the beam concentrating element is arranged directly close to the object to be reproduced, without any optical element being arranged therebetween. Of course, in other embodiments, other optical elements may be present between the beam concentrating element and the object to be reproduced. Similarly, the expression "the electro-optical regulating element is arranged downstream the recording medium in the light path" as used in this context indicates that, in the light path of the device for reproducing holographic information, the electro-optical regulating element is arranged downstream the recording medium. Namely, the reference beam impinges onto the recording medium to produce the reproducing beam, and the reproducing beam impinges onto the electro-optical regulating element. In the device for reproducing holographic information, no optical element is arranged between the recording medium and the electro-optical regulating element, while in another embodiment, there is another optical element therebetween.

An embodiment of the present disclosure provides a display apparatus, which comprises the device for recording holographic information described with reference to FIG. 2 and the device for reproducing holographic information described with reference to FIG. 5.

An embodiment of the present disclosure provides a method for recording and reproducing holographic information. Referring to FIG. 2, in an exemplary embodiment, during recording information relevant with the object to be reproduced, the method comprises steps of:

receiving the object beam 172 scattered by the object to be reproduced 170, and regulating an outgoing direction and a focal distance of the object beam 182 to irradiate the recording medium 140, by means of the electro-optical regulating element 180; and irradiating the recording medium with the reference beam 131, so that the reference beam 131 and the object beam 182 form information relevant with the object to be reproduced 170 in the recording medium 140.

As shown in FIG. 2, in an exemplary embodiment, during recording information relevant with the object to be reproduced, the method further comprises steps of:

splitting the source beam 101 emitted by the light source 100 into the reference beam 121 and the object beam 122;

irradiating the object to be reproduced 170 with the object beam 122;

regulating an outgoing direction and a focal distance of the object beam 172 scattered by the object to be reproduced 170, by means of the electro-optical regulating element 180; and while irradiating the recording medium 140 with the reference beam 121, irradiating the recording medium with the object beam 122.

In an exemplary embodiment, the method further comprises a step of: prior to splitting the source beam 101 emitted by the light source 100 into the reference beam 121 and the object beam 122, expanding and collimating the source beam 101.

In an exemplary embodiment, the method further comprises steps of: deflecting the reference beam 121 by means of the beam deflecting element 130; and irradiating the recording medium 140 with the deflected reference beam 131. For example, the method further comprises steps of: deflecting the object beam 122 by means of the beam deflecting element 150, and irradiating the object to be reproduced 170 with the deflected object beam 152.

In an exemplary embodiment, the step of irradiating the object to be reproduced 170 with the object beam 122 further comprises: converging the deflected object beam 152, and irradiating the object to be reproduced 170 with the converged object beam 162.

For example, referring to FIG. 5, during reproducing information relevant with the object to be reproduced, the method comprises steps of:

irradiating the recording medium 140 with the reference beam to produce the reproducing beam 142; and receiving the reproducing beam 142, and regulating an outgoing direction and focal distance of the reproducing beam 183 to form the holographic image 190 of the object to be reproduced 170, by means of the electro-optical regulating element 180.

As described above, in an exemplary embodiment, the electro-optical regulating element 180 is a liquid crystal lens.

According to the device and method for recording and reproducing holographic information, and the display apparatus of embodiments of the present disclosure, the electro-optical regulating element is adopted to regulate the outgoing direction and focal distance of the object beam for recording and reproducing holographic information, so that it is unnecessary to rotate the recording medium to record and reproduce holographic information. This simplifies recording and reproducing process and improves recording and reproducing reliability. Furthermore, since it is unnecessary to provide an actuating device for rotating the recording medium during recording and reproducing, a number of elements in the device for recording and reproducing holographic information is decreased, the construction is simplified and the cost is reduced. In addition, since the recording medium does not rotate, the crosstalk which otherwise would be caused by rotating the recording medium during recording and reproducing is prevented.

Apparently, the person with ordinary skill in the art can make various modifications and variations to the present disclosure without departing from the spirit and the scope of the present disclosure. In this way, provided that these modifications and variations of the present disclosure belong to the scopes of the claims of the present disclosure and the equivalent technologies thereof, the present disclosure also intends to encompass these modifications and variations.

What is claimed is:

1. A device for recording holographic information, comprising a light source and a recording medium, the light source being configured to provide a reference beam and an object beam, wherein the device for recording holographic information further comprises an electro-optical regulating element,
wherein the electro-optical regulating element is arranged in a light path between an object to be reproduced and the recording medium, receives the object beam which is diffusively reflected by the object to be reproduced, and regulates an outgoing direction and a focal distance of the object beam to irradiate the recording medium, and
wherein the recording medium is configured to receive the reference beam from the light source and the object beam which has been regulated by the electro-optical regulating element, and the reference beam and the object beam form information relevant with the object to be reproduced in the recording medium, wherein the first electro-optical regulating element is a liquid crystal lens which comprises a liquid crystal cell with an asymmetric electrode structure or a liquid crystal cell with a spherical chamber.

2. The device for recording holographic information of claim 1, further comprising a beam splitting element, which is configured to split a source beam from the light source into the reference beam and the object beam.

3. The device for recording holographic information of claim 1, further comprising at least one beam deflecting element, which is configured to deflect the reference beam to the recording medium and deflect the object beam to the object to be reproduced.

4. The device for recording holographic information of claim 1, further comprising a beam expanding element, which is arranged in a light path between the light source and the beam splitting element, receives a source beam emitted by the light source, and expands and collimates the source beam for irradiating the beam splitting element.

5. The device for recording holographic information of claim 1, further comprising a beam concentrating element, which is arranged upstream the object to be reproduced, and converges the object beam to the object to be reproduced.

6. The device for recording holographic information of claim 1, wherein the recording medium is one of a photorefractive crystal, a photorefractive polymer, a photopolymer, and a photochromic material.

7. The device for recording holographic information of claim 1, wherein the light source is a laser device, and the reference beam is coherent with the object beam.

8. A display apparatus, comprising the device for recording holographic information of claim 1 and a device for reproducing holographic information,
wherein the device for reproducing holographic information comprises a light source and a recording medium, the light source is configured to provide a reference beam, and the recording medium contains information relevant with the object to be reproduced which is formed by an object beam and the reference beam, wherein the device for recording holographic information further comprises an electro-optical regulating element,
wherein the recording medium is configured to receive the reference beam from the light source, and the reference beam interacts with information in the recording medium to produce a reproducing beam, and
wherein the electro-optical regulating element is arranged downstream the recording medium in a light path, receives the reproducing beam emitted from the recording medium, and regulates an outgoing direction and a focal distance of the reproducing beam to form an holographic image of the object to be reproduced.

9. A method for recording holographic information by using a device for recording holographic information, the device for recording holographic information comprising a light source and a recording medium, the light source being configured to provide a reference beam and an object beam, wherein the device for recording holographic information further comprises an electro-optical regulating element,
wherein the electro-optical regulating element is arranged in a light path between an object to be reproduced and the recording medium, receives the object beam which is diffusively reflected by the object to be reproduced, and regulates an outgoing direction and a focal distance of the object beam to irradiate the recording medium, and
wherein the recording medium is configured to receive the reference beam from the light source and the object beam which has been regulated by the electro-optical regulating element, and the reference beam and the object beam form information relevant with the object to be reproduced in the recording medium, wherein the first electro-optical regulating element is a liquid crystal lens which comprises a liquid crystal cell with an asymmetric electrode structure or a liquid crystal cell with a spherical chamber,
the method comprising steps of:
receiving the object beam diffusively reflected by the object to be reproduced, and regulating the outgoing direction and the focal distance of the object beam to irradiate the recording medium, by means of the electro-optical regulating element; and
irradiating the recording medium with the reference beam, so that the reference beam and the object beam form information relevant with the object to be reproduced in the recording medium.

10. The method for recording holographic information of claim 9, further comprising steps of:
splitting the source beam emitted by the light source into the reference beam and the object beam;
irradiating the object to be reproduced with the object beam;
regulating the outgoing direction and the focal distance of the object beam diffusively reflected by the object to be reproduced; and
irradiating the recording medium with the object beam, while irradiating the recording medium with the reference beam.

11. The method for recording holographic information of claim 10, further comprising a step of: prior to splitting the source beam emitted by the light source into the reference beam and the object beam, expanding and collimating the source beam.

12. The method for recording holographic information of claim 10, wherein the step of irradiating the object to be reproduced with the object beam further comprises a step of: converging the object beam to the object to be reproduced.

* * * * *